United States Patent
Skog et al.

(10) Patent No.: US 9,307,450 B2
(45) Date of Patent: Apr. 5, 2016

(54) METHOD AND APPARATUS FOR CONTENT CACHING IN A WIRELESS COMMUNICATION NETWORK

(71) Applicant: Telefonaktiebolaget L M Ericsson (publ), Stockholm (SE)

(72) Inventors: Robert Skog, Hässelby (SE); Diomedes Kastanis, Stockholm (SE); Chris McEvilly, Bagshot (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 289 days.

(21) Appl. No.: 13/973,335

(22) Filed: Aug. 22, 2013

(65) Prior Publication Data

US 2015/0016256 A1 Jan. 15, 2015

Related U.S. Application Data

(60) Provisional application No. 61/845,077, filed on Jul. 11, 2013.

(51) Int. Cl.
*G06F 15/16* (2006.01)
*H04W 28/14* (2009.01)
(Continued)

(52) U.S. Cl.
CPC ........... *H04W 28/14* (2013.01); *H04L 67/2842* (2013.01); *H04W 4/18* (2013.01); *H04W 28/0268* (2013.01); *H04L 67/288* (2013.01); *H04W 88/16* (2013.01)

(58) Field of Classification Search
CPC ................ H04L 67/2842; H04L 67/2847
USPC ........................................................ 709/203
See application file for complete search history.

(56) References Cited

U.S. PATENT DOCUMENTS 8,234,373 B1 * 7/2012 Ulvenes .................. 709/225
8,467,773 B1 6/2013 Soelberg et al.
(Continued)

FOREIGN PATENT DOCUMENTS

CN 102711072 A 10/2012
EP 2416525 A1 2/2012
(Continued)

OTHER PUBLICATIONS

3GPP, "3rd Generation Partnership Project; Technical Specification Group Radio Access Network; Evolved Universal Terrestrial Radio Access Network (E-UTRAN); Architecture description (Release 12)", 3GPP TS 36.401 V12.0.0, Sep. 2014, 1-20.
(Continued)

*Primary Examiner* — Mark Rinehart
*Assistant Examiner* — Matthew Hopkins
(74) *Attorney, Agent, or Firm* — Murphy, Bilak & Homiller, PLLC

(57) ABSTRACT

The teachings herein describe methods and apparatuses for caching content at the "edge" of a wireless communication network, based on operating one or more RAN caches within the RAN portion of the network under the control of a gateway cache that operates at the packet data network interface level within the CN portion of the network. Each RAN cache operates as subordinate of the gateway cache, based on intercepting content requests from wireless devices operating within the RAN, providing corresponding proxied content requests to the gateway cache, and serving or not serving requested content from the RAN cache in dependence on control signaling from the gateway cache. Such operation permits all decision making to reside in the gateway cache, thereby retaining full visibility for critical billing and lawful intercept functions, while obviating in many instances the need to back haul such content.

15 Claims, 12 Drawing Sheets

(51) Int. Cl.
*H04W 28/02* (2009.01)
*H04L 29/08* (2006.01)
*H04W 4/18* (2009.01)
*H04W 88/16* (2009.01)

(56) References Cited

U.S. PATENT DOCUMENTS

| | | | |
|---|---|---|---|
| 8,713,093 | B1* | 4/2014 | Upadhyay et al. ............ 709/203 |
| 2006/0035707 | A1 | 2/2006 | Nguyen et al. |
| 2010/0034089 | A1 | 2/2010 | Kovvali et al. |
| 2010/0188975 | A1 | 7/2010 | Raleigh et al. |
| 2011/0098075 | A1 | 4/2011 | Bienas et al. |
| 2011/0202634 | A1 | 8/2011 | Kovvali et al. |
| 2012/0210003 | A1 | 8/2012 | Castro et al. |
| 2013/0013726 | A1* | 1/2013 | Westberg et al. ............ 709/213 |
| 2013/0176846 | A1 | 7/2013 | Callard et al. |
| 2013/0294321 | A1 | 11/2013 | Wang et al. |

FOREIGN PATENT DOCUMENTS

| | | |
|---|---|---|
| WO | 2013043088 A1 | 3/2013 |
| WO | 2014017789 A1 | 1/2014 |

OTHER PUBLICATIONS

3GPP, "3rd Generation Partnership Project; Technical Specification Group Services and System Aspects; Multimedia Broadcast/Multicast Service (MBMS); Architecture and functional description (Release 11)", 3GPP TS 23.246 V11.1.0, Mar. 2012, 1-66.

3GPP, "3rd Generation Partnership Project; Technical Specification Group Services and System Aspects; Multimedia Broadcast/Multicast Service (MBMS); Architecture and functional description (Release 12)", 3GPP TS 23.246 V12.3.0, Sep. 2014, 1-67.

3GPP, "3rd Generation Partnership Project; Technical Specification Group Services and System Aspects; Multimedia Broadcast/Multicast Service (MBMS); Protocols and codecs (Release 11)", 3GPP TS 26.346 V11.0.0, Mar. 2012, 1-163.

3GPP, "3rd Generation Partnership Project; Technical Specification Group Services and System Aspects; Multimedia Broadcast/Multicast Service (MBMS); Protocols and codecs (Release 11)", 3GPP TS 26.346 V11.6.0, Sep. 2013, 1-168.

3GPP, "3rd Generation Partnership Project; Technical Specification Group Services and System Aspects; Policy and charging control architecture (Release 11)", 3GPP TS 23.203 V11.11.0, Sep. 2009, 1-182.

3GPP, "3rd Generation Partnership Project; Technical Specification Group Services and System Aspects; Telecommunication management; Charging management; Multimedia Broadcast and Multicast Service (MBMS) charging (Release 10)", 3GPP TS 32.273 V10.0.0, Mar. 2011, 1-43.

3GPP, "3rd Generation Partnership Project; Technical Specification Group Services and System Aspects; Telecommunication management; Charging management; Multimedia Broadcast and Multicast Service (MBMS) charging (Release 11)", 3GPP TS 32.273 V11.0.0, Sep. 2012, 1-43.

3GPP, "3rd Generation Partnership Project; Technical Specification Group Services and System Aspects; Telecommunication management; Charging management; Multimedia Broadcast and Multicast Service (MBMS) charging (Release 12)", 3GPP TS 32.273 V12.0.0, Sep. 2014, 1-49.

Da Silva, Icaro et al., "Method and Apparatus for Pre-Fetched Content Charging", U.S. Appl. No. 14/132,478, filed Dec. 18, 2013.

Skog, Robert et al., "Method and Apparatus for Content Caching in a Wireless Communication Network", U.S. Appl. No. 13/973,335, filed Aug. 22, 2013.

* cited by examiner

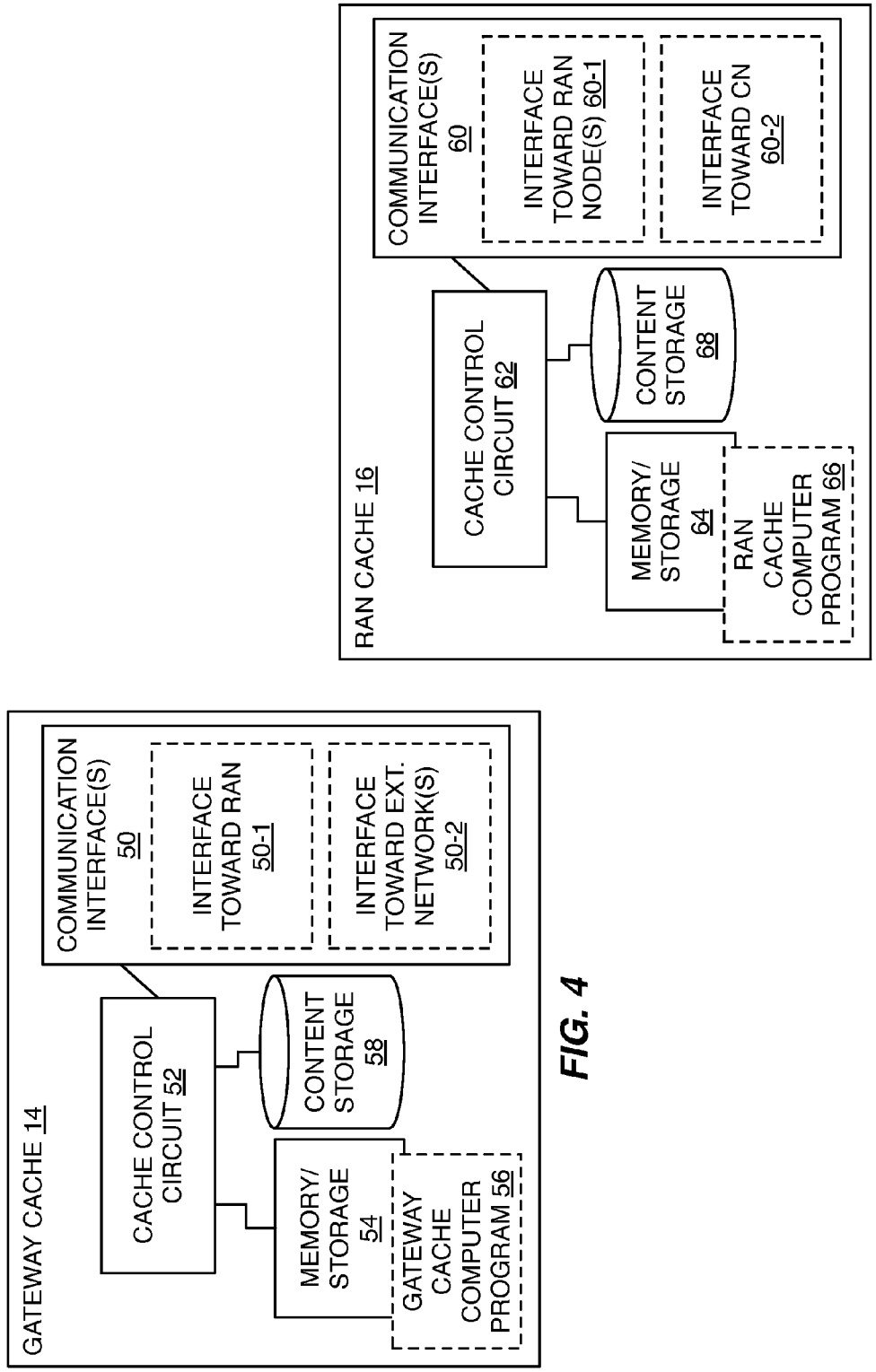

MULTI-ACCESS NETWORK EXAMPLE

METHOD AND APPARATUS FOR CONTENT CACHING IN A WIRELESS COMMUNICATION NETWORK

RELATED APPLICATIONS

This application claims priority from the U.S. provisional patent application filed on 11 Jul. 2013 and assigned Application No. 61/845,077, which is incorporated herein by reference.

TECHNICAL FIELD

The present invention generally relates to wireless communication networks, and particularly relates to content caching in such networks.

BACKGROUND

Increasing data rates and higher Quality-of-Service (QoS) offered by current and developing wireless communication networks provide the users of such networks with new opportunities to consume a variety of electronic content via their various types of wireless devices. It is now commonplace for users to watch movies, videos, and/or browse media-rich web content via their smartphones, tablets, and other media consumption devices. Here, the term "media consumption device" broadly denotes essentially any type of wireless device or apparatus that has a wireless communication network interface, e.g., a cellular network transceiver and associated authentication and protocol processing, and further has one or more audio and/or video interfaces, to allow for content consumption by a user of the device.

Content caching represents a known technique for managing content consumption within communication networks and within the one or more packet data networks—e.g., the Internet—that originate the various items of content being consumed by users within the wireless communication network. With content caching, the network operator or other entity caches at least some content, e.g., content that is known or expected to be popular with users of the wireless communication network, in a network cache that generally resides in or operates in conjunction with a Core Network (CN) portion of the wireless communication network.

For a number of key reasons, this type of network caching conventionally operates at the packet data network interface of the wireless communication network. Performing caching at the packet data network interface—i.e., at point where CN packet gateway provides incoming and outgoing routing of user-plane Internet Protocol (IP) traffic—the network operator maintains full visibility of caching operations for billing and lawful intercept purposes.

For example, in the context of a 3GPP network based on the GSM (Global System for Mobile communications) or the WCDMA (Wideband Code Division Multiple Access) standard, caching may be implemented at the GGSN level, where "GGSN" denotes Gateway GPRS Support Node, and "GPRS" denotes General Packet Radio Services. The GGSN is a CN node that operates as the IP anchor point for wireless devices operating within the RAN. As such, the GGSN maintains the routing information necessary to tunnel protocol data units (PDUs) for specific wireless devices to the Serving GSNs associated with the particular areas of the RAN in which respective ones of those wireless devices are operating. In turn, the RAN includes radio nodes, such as "NodeBs" in the WCDMA context, each of which provides radio coverage over one or more given cells or other such service areas.

Broadly, the GGSN performs IP address assignments for wireless devices connected to the wireless communication network and operates as the default router for connected wireless devices, which are referred to as "User Equipments" or UEs in the 3GPP context. User-plane traffic, including content requests, such as HTTP Get requests, originate from given wireless devices and flow through GTP tunnels from the RAN to the SGSNs/GGSN. Here, "GTP" connotes the GPRS Tunneling Protocol. A network-level cache operates at the GGSN level, e.g., by providing cached content that would otherwise be sourced from a packet data network external to the wireless communication network.

While such network-level caching offers certain efficiencies as compared to a scenario where requested content is always sourced from the targeted content origin servers, it is recognized herein that significant disadvantages attend conventional network-level caching. For example, even though cached content does not have to be sourced from outside of the wireless communication network, the wireless communication network is obligated to "back haul" cached content from the CN to the radio nodes in the RAN that serve the wireless device(s) that requested the cached content. Here, the term "back haul" denotes the transport of traffic and/or signaling over the communication links between the CN and the RAN, and it is recognized herein that bandwidth on back-haul communication links remains a relatively constrained resource, even in contemporary and developing networks.

Correspondingly, it is further recognized that back-haul link congestion affects the quality of experience for users that are consuming content. For example, back-haul link congestion can result in the need to serve lower-quality streams, e.g., by serving video and/or audio content at higher compression levels and at reduced bit rates. Such congestion also can result in dropped connections, latency, jitter, and other pathologies that degrade the users' content consumption experience.

These problems become particularly acute for certain high-bandwidth services, referred to as broadband content and exemplified by High Definition (HD) movie streaming. Acute problems also arise for certain consumption phenomena, such as the "flash crowd" phenomena, which places severe burdens on the back haul and is characterized by a potentially large number of users within the same location (e.g., a football stadium) requesting content at the same time or at overlapping times.

While such problems are presented in the context of GSM and/or WCDMA networks, with or without High Speed Packet Access (HSPA) services, they are equally applicable to a variety of other wireless communication networks. For example, in a Long Term Evolution (LTE) context, the wireless communication network is implemented according to the System Architecture Evolution or SAE, wherein the CN is an Evolved Packet Core or EPC. In turn, the EPC includes an SAE gateway that provides the same or similar functionality as the above-described GGSN, and works in conjunction with a Mobility Management Entity (MME) that provides mobility management for wireless devices operating within the RAN portion of the wireless communication network. Further in the LTE context, the RAN includes radio nodes that are referred to as eNBs, and which connect via an S1 interface to the EPC.

SUMMARY

The teachings herein describe methods and apparatuses for caching content at the "edge" of a wireless communication network, based on operating one or more RAN caches within the RAN portion of the network under the control of a gateway cache that operates at the packet data network interface level within the CN portion of the network. Each RAN cache operates as subordinate of the gateway cache, based on intercepting content requests from wireless devices operating within the RAN, providing corresponding proxied content requests to the gateway cache, and serving or not serving requested content from the RAN cache in dependence on control signaling from the gateway cache. Such operation permits all decision making to reside in the gateway cache, thereby retaining full visibility for critical billing and lawful intercept functions, while obviating in many instances the need to back haul such content.

One embodiment comprises a method of content caching in a wireless communication network comprising a RAN and an associated CN. The method includes operating a gateway cache in the CN at a packet data network interface of the CN, and operating a RAN cache in the RAN, as a subordinate to the gateway cache. "Operating" the RAN cache according to this example method includes intercepting content requests for requested content, where the intercepted content requests originate from wireless devices served by a portion of the RAN with which the RAN cache is associated. The method further includes sending proxied content requests corresponding to the intercepted content requests, to the gateway cache.

For each given proxied content request sent from the RAN cache to the gateway cache, the method includes serving or not serving the requested content from the RAN cache in dependence on receiving control signaling from the gateway cache. When the received control signaling instructs the RAN cache to serve the requested content from the RAN cache, the method includes serving the requested content from the RAN cache, tracking content consumption information at the RAN cache for the requested content as served from the RAN cache, and subsequently sending the content consumption information to the gateway cache. By sending the content consumption information, the gateway cache retains full visibility of the content consumption event, e.g., for billing and/or lawful intercept purposes.

In a related embodiment, the above-described method, or a variation of it, is implemented in a RAN cache. The example RAN cache includes a first communication interface towards one or more radio nodes in the RAN, and a second communication interface towards the CN, e.g., towards the gateway cache. The RAN cache further includes a cache control circuit that is operatively associated with the first and second communication interfaces, and that is configured to perform caching at the RAN level as contemplated herein.

The cache control circuit comprises fixed and/or programmed circuitry. In at least one embodiment, the cache control circuit comprises one or more microprocessors or other digital processing circuits that include or are associated with supporting circuitry, such as memory/storage. In at least one such embodiment, the RAN cache can be understood as a physical or logical node within the RAN that operates as server providing the described RAN caching services, based at least in part on its execution of a computer program stored in a computer-readable medium.

A complementary embodiment comprises a method of content delivery from a wireless communication network that includes a RAN and a CN. The method includes operating a gateway cache at a packet data network interface of the CN. Such operation includes receiving proxied content requests from a RAN cache operating in the RAN. In particular, the RAN cache operates as a subordinate of the gateway cache and sends the proxied content requests, based on intercepting content requests originating from wireless devices operating in a portion of the RAN served by the RAN cache.

For each given proxied content request received at the gateway cache, the method further includes determining whether or not to serve the requested content from the RAN cache, based on determining whether or not the requested content is in the RAN cache, and further based on determining whether delivery of the requested content is restricted from delivery via the RAN cache. Delivery from the RAN cache may be restricted either on the basis of the requested content or on the basis of the wireless device that requested the requested content.

When the decision is made to serve the requested content from the RAN cache, the method includes sending control signaling instructing the RAN cache to serve the requested content, subsequently receiving content consumption information from the RAN cache indicating an amount of the requested content that was served to the requesting wireless device, and recording the content consumption information for charging and/or lawful intercept uses. When the decision is made not to serve the requested content from the RAN cache, the method includes sending control signaling to the RAN cache instructing the RAN cache not to serve the requested content, serving the requested content from the gateway cache if the requested content is servable from the gateway cache or serving the requested content from a content origin server targeted by the proxied content request, and recording content consumption information for billing and/or lawful intercept purposes. The recorded content information indicates the amount of the requested content, as served from the gateway cache, or as obtained from the content origin server.

As with the RAN cache, the gateway cache is a physical or functional node, but it is implemented on the packet data network interface of the CN (e.g., Gi or SGi interface), or interposed between the packet gateway and the packet data network interface of the CN. An example gateway cache includes a first communication interface towards the RAN, e.g., towards the one or more RAN caches, and includes a second communication interface towards the packet data network interface of the CN. The gateway cache further includes a cache control circuit that is operatively associated with the first and second communication interfaces and configured to receive proxied content requests from a RAN cache operating in the RAN. As explained before, the proxied content requests from a given RAN cache correspond to intercepted content requests originating from wireless devices that are operating in the portion of the RAN served by the given RAN cache and intercepted by the given RAN cache.

For each proxied content request received at the gateway cache, the cache control circuit of the gateway cache is configured to determine whether or not to serve the requested content from the RAN cache. The decision is based on determining whether or not the requested content is in the RAN cache, and is further based on determining whether delivery of the requested content is restricted from delivery via the RAN cache. Delivery may be restricted either on the basis of the requested content or on the basis of the wireless device that requested the requested content. When the decision is made to serve the requested content from the RAN cache, the cache control circuit of the gateway cache is configured to send control signaling instructing the RAN cache to serve the requested content, subsequently receive content consumption information from the RAN cache indicating an amount of the requested content that was served to the requesting wireless device, and record the content consumption information for charging and/or lawful intercept uses.

Conversely, when the decision is made not to serve the requested content from the RAN cache, the cache control circuit of the gateway cache is configured to send control signaling to the RAN cache instructing the RAN cache not to serve the requested content. In the same processing context, the cache control circuit of the gateway cache is further configured to serve the requested content from the gateway cache if the requested content is servable from the gateway cache or serve the requested content from a content origin server targeted by the proxied content request, and record content consumption information for billing and/or lawful intercept purposes. The recorded content consumption information indicates the amount of the requested content as served from the gateway cache or the content origin server.

Still further, the cache control circuit of the gateway cache may be further configured to interface with one or more billing systems (e.g., an offline or online charging system) and/or one or more lawful intercept systems. In such embodiments, the cache control circuit of the gateway cache is configured to provide recorded content consumption information directly or indirectly, for one or both such systems.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a block diagram of one embodiment of a gateway cache.

FIG. 6 is a block diagram of one embodiment of a RAN cache.

DETAILED DESCRIPTION

Figure 1:
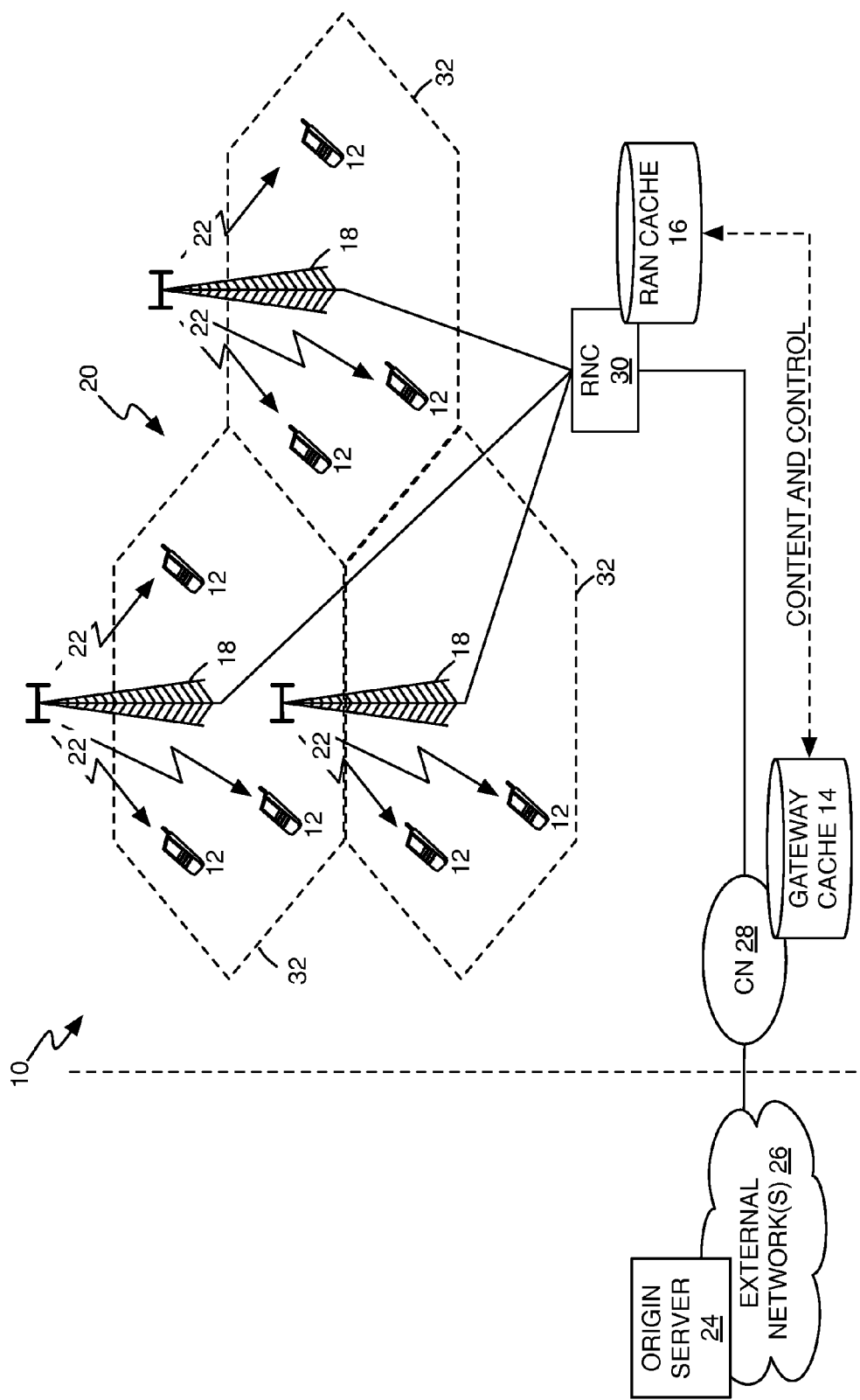
FIG. 1 is a block diagram of one embodiment of a wireless communication network that includes a gateway cache and a RAN cache.

FIG. 1 illustrates an example wireless communication network 10 (hereafter "network 10") that provides communication services to a plurality of wireless apparatuses or devices 12 (hereafter "wireless devices 12"), including the delivery of electronic content via an advantageous caching arrangement represented in the diagram by a gateway cache 14 and a RAN cache 16. Here, "RAN" denotes "Radio Access Network" and signifies that the RAN cache 16 operates near or at the "edge" of the network 10, which edge can be understood as the air interface between the radio nodes 18 included in the RAN 20 of the network 10.

The network 10 delivers content to given wireless devices 12 via downlink signals 22 transmitted from the radio nodes 18. Those of ordinary skill in the art will appreciate that the air interface includes both downlink and uplink radio links, and that full details of the carrier and channel structures for control-plane signaling and user-plane traffic are not shown. The omission avoids cluttering the diagram and such details are not germane to explaining the cache teachings presented herein. It is enough to note that potentially large pluralities of wireless devices 12 may request and consume various content via the network 10—e.g., broadband content, such as movies, videos, and other web content.

At least some such content originates from one or more content origin servers 24 that are accessed through a packet data network interface of the network 10. The content origin server(s) 24 are located in one or more external networks 26, such as the Internet. In a non-limiting example, a content origin server may be owned or operated by the owner of a movie service or an Internet video service. A cache external to the network 10 also may operate as a content origin server, for purposes of this discussion.

Regardless, the network 10 provides the wireless devices 12 with connectivity to such content sources via a Core Network (CN) 28, which includes a variety of physical and/or functional entities, not all of which are shown in the figure. For example, the CN 28 generally includes mobility management entities, access/authentication/accounting (AAA) entities, routing entities (e.g., gateways), etc. This disclosure provides subsequent example CN details, to aid in understanding the cache teachings herein. However, it will be understood that the various depictions of example details for the CN 28 and RAN 20 are simplified for ease of discussion.

It should also be understood that the overall network architecture depicted in FIG. 1 stands as a non-limiting example. Consider the depiction of the Radio Network Controller (RNC) 30, for example. The RAN 20 may include multiple RNCs 30, with each RNC 30 providing centralized control for a number of radio nodes 18. In this context, the radio nodes 18 may be Base Transceiver Stations (BTSs).

In turn, each radio node 18 provides communication services over one or more defined geographic areas using a particular allocation of air interface resources—e.g., particular carrier frequencies or frequency bands. The conjunction of given radio resource allocations over given coverage areas may be referred to as "cells" 32. A given RAN cache 16 may be associated with one or more particular cells 32 in the RAN 20. The RAN cache 16 may cache particular content that is being consumed by one or more of the wireless devices 12 in its associated portion of the RAN 20, and/or cache content for which there is a high expectation of consumption—e.g., particularly popular movies or videos, etc. Of course, such caching examples are non-limiting and the RAN cache contents and operation are subordinated to control of the gateway cache 14 according to the cache teachings presented herein.

Figure 2:
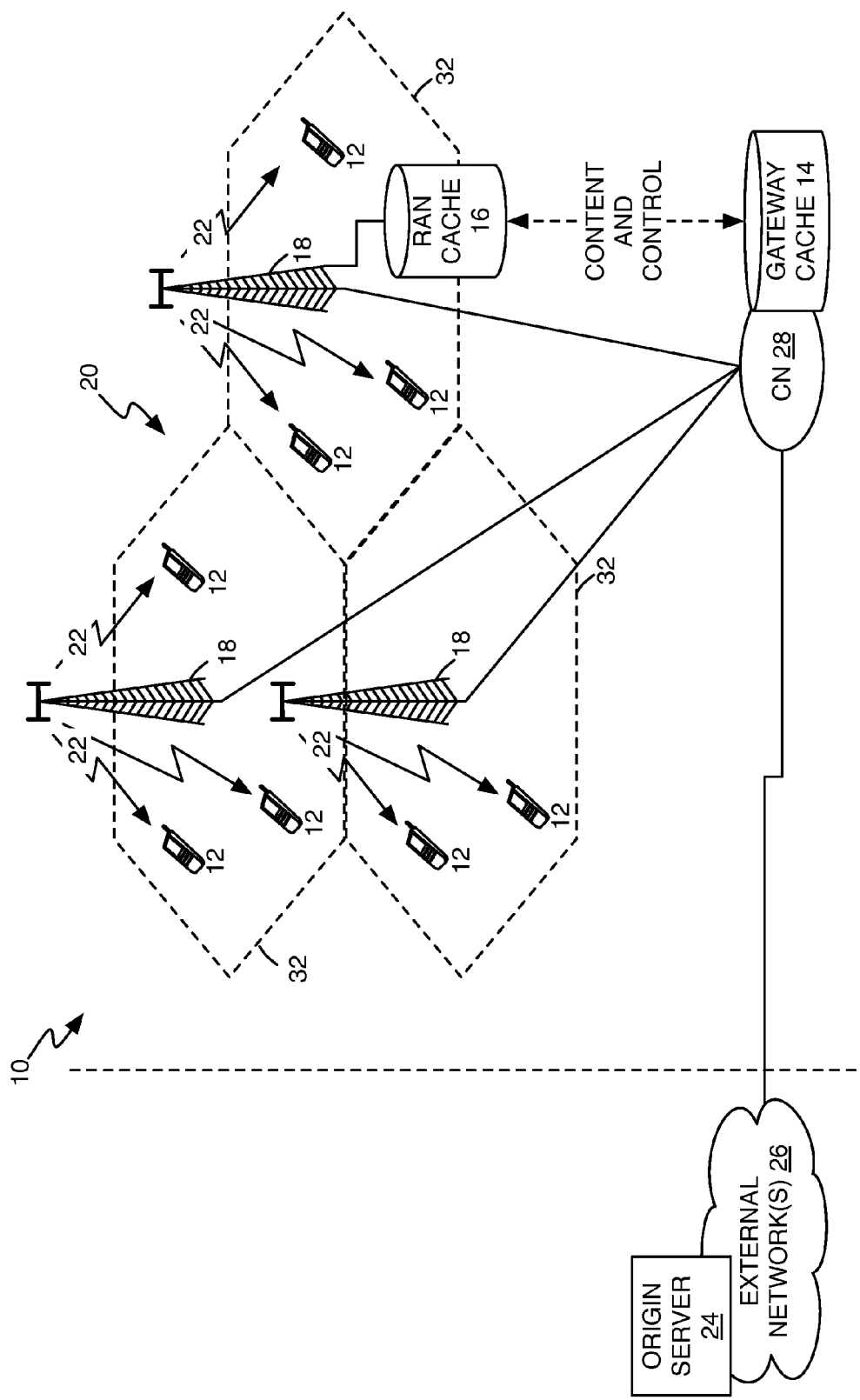
FIG. 2 is a block diagram of another embodiment of a wireless communication network that includes a gateway cache and a RAN cache.

FIG. 2 illustrates a nearly identical arrangement as that depicted in FIG. 1, except that the network architecture is flatter, in the sense that the radio nodes 18 connect directly back to the CN 28 without use of an intermediate RNC 30. In an example case, the network 10 as depicted in FIG. 2 is an LTE type network, where the radio nodes 18 are eNodeBs, and the RAN cache 16 is pushed down to the eNodeB level.

While only one RAN cache 16 is shown in FIG. 2, it will be understood that there may be multiple RAN caches 16 distributed within the RAN 20, each operating under control of the gateway cache 14 and each associated with a respective one (or ones) of the radio nodes 18 operating as eNodeBs. The eNodeB/RAN-cache mapping may be one-to-one, where each eNodeB has its own RAN cache 16, or several eNodeBs may share a RAN cache 16, such as via inter-eNodeB communication on the "X2" interface specified in LTE.

The RNC-based arrangement of the network 10 in FIG. 1 may be understood as exemplifying an arrangement contemplated for GPRS/EDGE type implementations of the network 10 and/or WCDMA/HSPA type implementations of the network 10. Although only one RNC 30 and one RAN cache 16 are depicted in FIG. 1, the RAN 20 may include multiple RNCs 30, where RAN cache 16 is associated with a given one or ones of the RNCs 30.

The above non-limiting examples of network types and implementation variations will also suggest to those of ordinary skill in the art that the wireless devices 12 may be essentially any type of wireless apparatus or system that is configured to operate within the network 10. Non-limiting examples include User Equipment (UEs) configured to operate according to 3GPP embodiments of the network 10. More broadly, the wireless devices 12 may include any mix of mobile or fixed communication devices or terminals, such as smartphones, tablets, computers, etc. The example wireless device 12 includes a communication interface, e.g., a cellular radio transceiver, and associated processing circuitry, e.g., microprocessor-based circuitry. The example wireless device 12 further includes one or more user interface elements, such as a display and speakers, to support the consumption of content by a user.

Figure 3:
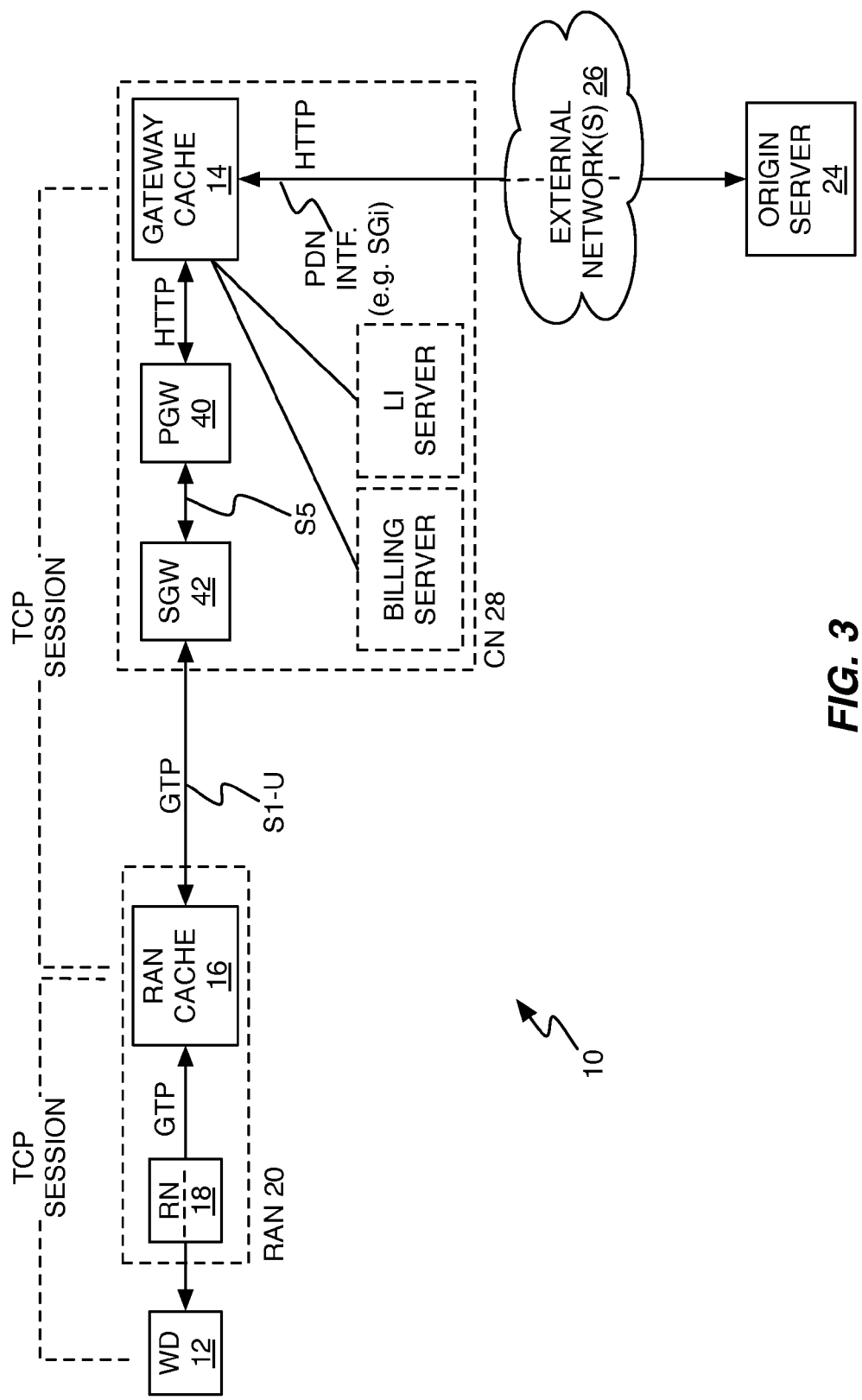
FIG. 3 is a block diagram focusing on the entities involved in one embodiment of delivering cached content via a gateway cache and a RAN cache.

FIG. 3 provides a simplified depiction of entities, connections and interfaces involved in the flow of content, in a non-limiting LTE example embodiment. Here, the RAN 20 is implemented as an Evolved Universal Terrestrial Radio Access Network or E-UTRAN according to 3GPP TS 36.300, and the CN 28 is implemented as an Evolved Packet Core or EPC according to 3GPP TS 23.002, 3GPP TS 23.401 (defining the EPC architecture with respect to E-UTRAN access), and 3GPP TS 23.402 (defining EPC architecture enhancements for non-3GPP accesses).

The interface names and underlying protocols and implementation details will vary in dependence on the RAN and CN implementations. However, the top-level logical operation, features and capabilities of the gateway cache 14 and the RAN cache 16 as taught herein are consistent across various types of networks, including networks that provide Generalized Packet Radio Services (GPRS), and include Gateway GPRS Support Nodes (GGSNs), Serving GSNs and other GPRS support nodes, where user-plane IP traffic, including content delivered from the gateway cache 14 and/or from the RAN cache(s) 16, is conveyed using the GPRS Tunneling Protocol or GTP.

The gateway cache 14 may also be referred to as a "master" cache, because it provides control and supervision for each RAN cache 16, and because it has complete visibility into and control of the particular content served from the RAN cache 16 to particular ones of the wireless devices 12. With this point in mind, FIG. 4 illustrates an example embodiment of the gateway cache 14, which is configured for operation in the CN 28 of the network 10. In particular, the gateway cache 14 is configured to operate at a packet data network interface of the CN 28. As an example, the packet data network interface may comprise a Gi or SGi interface, as is known.

The example gateway cache 14 includes communication interface(s) 50, a cache control circuit 52, memory/storage 54, e.g., to store a gateway cache computer program 56, and content storage 58 to cache content. The communication interface(s) 50 include a first communication interface 50-1 towards the RAN 20, e.g., towards a RAN cache 16 operating in the RAN 20, subordinate to the gateway cache 14. The communication interface(s) 50 further include a second communication interface 50-2 towards the packet data network interface.

The cache control circuit 52 is operatively associated with the first and second communication interfaces 50-1 and 50-2 and is configured to receive proxied content requests from the RAN cache 16. The proxied content requests correspond to intercepted content requests. In turn, the intercepted content requests originate from wireless devices 12 operating in the RAN 20 and are intercepted by the RAN cache 16.

For each given proxied content request received at the gateway cache, the cache control circuit 52 is configured to determine whether or not to serve the requested content from the RAN cache 16 based on determining whether or not the requested content is in the RAN cache 16, and further based determining whether delivery of the requested content is restricted from delivery via the RAN cache 16. Delivery from the RAN cache 16 may be restricted either on the basis of the requested content, or on the basis of the wireless device that requested the requested content.

As a non-limiting example, the content may be restricted from delivery via the RAN cache 16 if the requesting wireless device 12 is subject to a lawful intercept in which the actual content served to the wireless device 12 must be delivered to a lawful intercept system. Delivery from the RAN cache 16 may be permitted even when the requesting wireless device 12 is subject to a lawful intercept under which is it sufficient merely to provide a copy of or a listing of the content served to the wireless device 12. In a more general example, content may be restricted from delivery via the RAN cache 16 based on any one or more of the following decision points: Lawful Intercept (LI) restrictions; billing limits or other subscription restrictions; security limits, such as parental blocks; service limits; and any one or more operator-configurable restrictions.

When the decision is made to serve the requested content from the RAN cache for given proxied content request, the cache control circuit 52 is configured to send control signaling instructing the RAN cache 16 to serve the requested content, subsequently receive content consumption information from the RAN cache 16 indicating an amount of the requested content that was served to the requesting wireless device 12, and record the content consumption information for charging and/or lawful intercept uses. This and other such control signaling may be sent in-band via a header enrichment.

Conversely, when the decision is made not to serve the requested content from the RAN cache 16, the cache control circuit 52 is configured to send control signaling to the RAN cache 16 instructing the RAN cache 16 not to serve the requested content. Further in this case, the cache control circuit 52 is configured to serve the requested content from the gateway cache 14 if the requested content is servable from the gateway cache 14, or serve the requested content from a content origin server 24 targeted by the proxied content request. In either case, the cache control circuit 42 is configured to record content consumption information for billing and/or lawful intercept purposes. Here, the recorded content consumption information indicates the amount of the requested content as served from the gateway cache 14 or the content origin server 24.

Figure 5A:
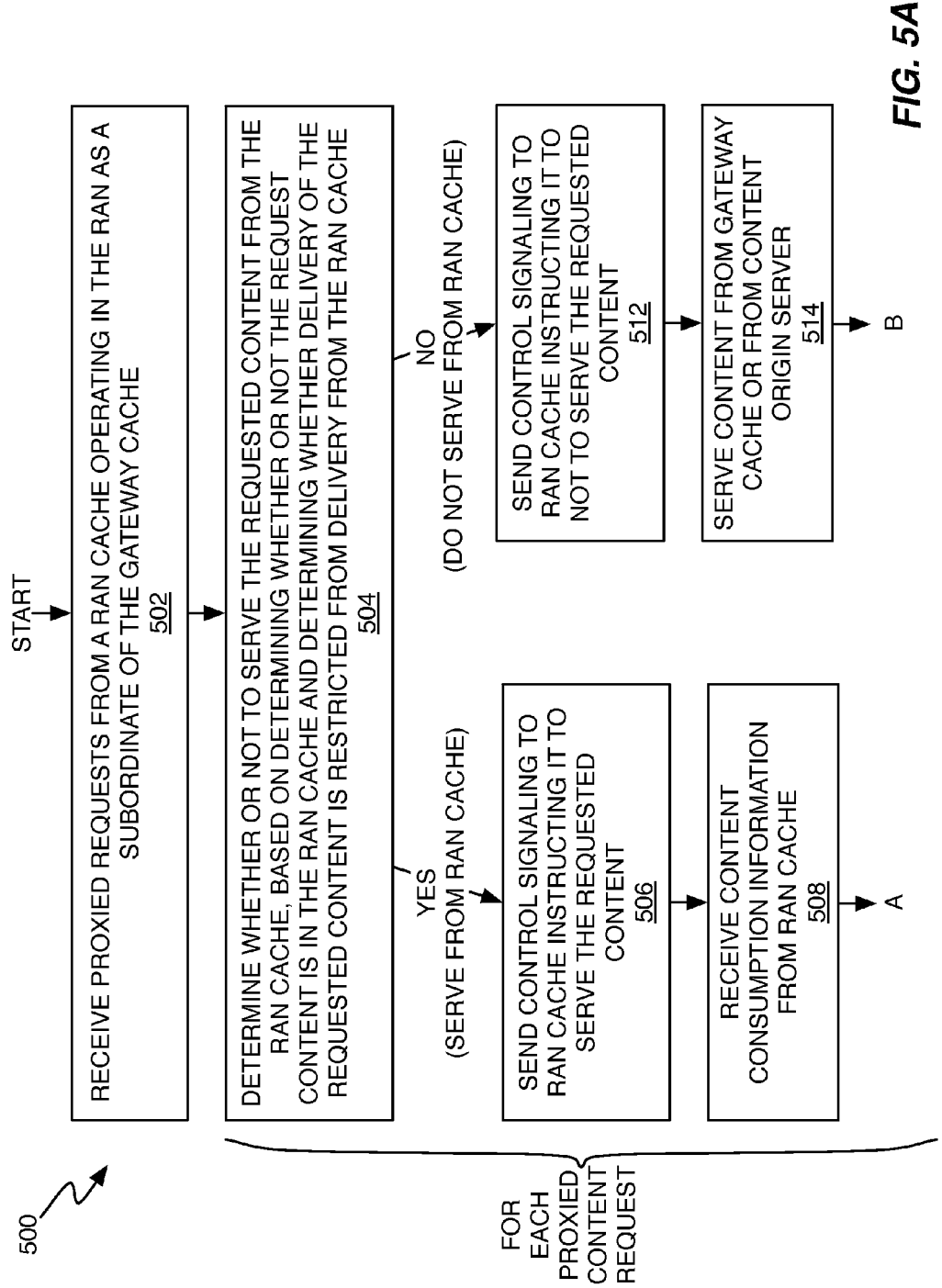
FIGS. 5A and 5B depict a logic flow diagram of one embodiment of a method of processing at a gateway cache.
Figure 5B:
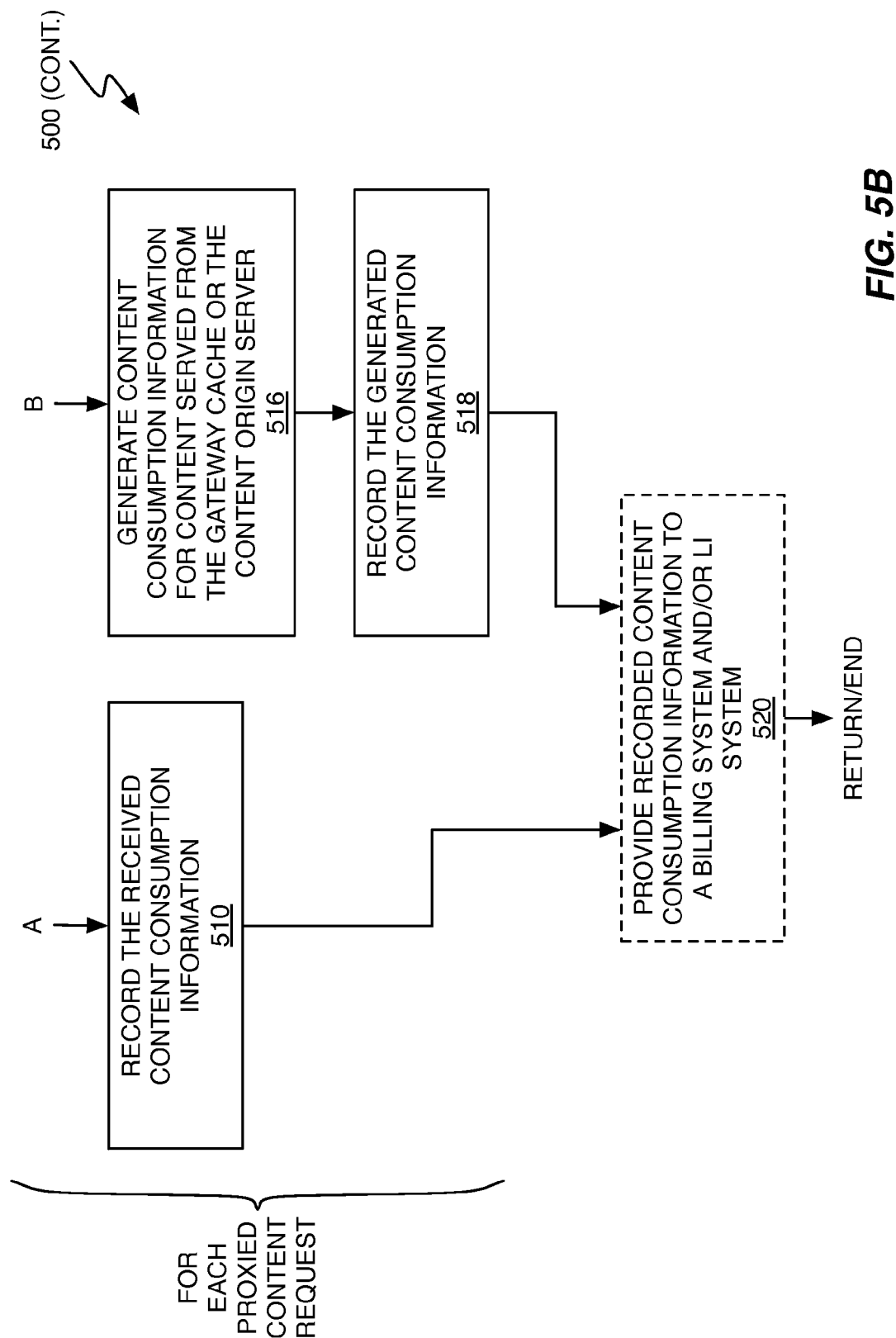

FIGS. 5A and 5B illustrates a method 500 of content delivery from a network 10 that includes a RAN 20 and a CN 28. The method 500 comprises operating a gateway cache 14 at a packet data network interface of the CN 28, including receiving (Block 502) proxied content requests from a RAN cache 16. In this context, the RAN cache 16 operates in the RAN 20 as a subordinate to the gateway cache 14. The RAN cache 16 sends the proxied content requests, based on intercepting content requests originating from wireless devices 12 operating in a portion of the RAN 20 served by the RAN cache 16.

The method 500 further includes, for each given proxied content request received at the gateway cache 14, determining (Block 504) whether or not to serve the requested content from the RAN cache 16. The determination is based on the gateway cache 14 determining whether or not the requested content is in the RAN cache 16, and further based on determining whether the requested content is restricted from delivery via the RAN cache 16. Such a restriction may exist either on the basis of the requested content or on the basis of the wireless device 12 that requested the requested content.

When the decision is made to serve the requested content from the RAN cache 16 (YES from Block 504), the method 500 continues with sending (Block 506) control signaling instructing the RAN cache 16 to serve the requested content, and subsequently receiving (Block 508) content consumption information from the RAN cache 16. The received content consumption information indicates, for example, an amount of the requested content that was served to the requesting wireless device 12. The method 500 continues along the YES path with recording (Block 510, FIG. 5B) the received content consumption information, e.g., for charging and/or lawful intercept uses.

Conversely, when the decision is made not to serve the requested content from the RAN cache 16 (NO from Block 504), the method 500 continues with sending control signaling to the RAN cache 16 instructing it not to serve the requested content (Block 512). Equivalently, the gateway cache 14 may withhold the instruction to serve the requested content. Processing further continues along the NO path from Block 504 with serving (Block 514) the requested content from the gateway cache 14, or from a targeted content origin server 24 that is accessible via the packet data network interface of the network 10. Still further along the NO processing path, the method 500 includes generating (Block 516) content consumption information for the requested content, as served from the gateway cache 14, or as served from the content origin server 24, and recording (Block 518) the generated content consumption information.

As a consequence of progressing along either the YES or the NO processing path, the gateway cache 14 obtains content consumption information for the requested content, either as received from the RAN cache 16, in the case that the requested content is served from the RAN cache 16, or as generated based on serving the requested content from the gateway cache 14 or the content origin server 24.

In either case, the content consumption information recorded at the gateway cache 14 includes, e.g., an indication of the amount of the requested content that was served, such as a byte count. The content consumption information is used in billing and/or for lawful intercept purposes, and the method 500 may therefore further include providing (Block 520) the recorded content consumption information to a billing system and/or to a lawful intercept (LI) system.

It will be appreciated that the method 500, and variations of it, are implemented in one or more embodiments based on the programmatic configuration of the gateway cache. For example, the cache control circuit 52 executes computer program instructions stored in the memory/storage 54 of the gateway cache 14. The memory/storage 54 may comprise more than one type of memory circuit or storage element, and in general comprises one or more computer-readable mediums. The memory/storage 54 may include volatile working memory and non-volatile configuration and/or program memory. Some embodiments include a gateway cache computer program 56, which is stored in the memory/storage 54. Execution of the gateway cache computer program 56 by the cache control circuit 52 configures the gateway cache 14 to carry out the method 500, or variations of it.

Regarding such variations, the method 500 may further include receiving non-proxied content requests originating directly from requesting wireless devices 12 operating in the RAN. That is, at least some portions of the RAN 20 (or another RAN 20) may not include RAN caches 16. In such cases, the gateway cache 14 receives original content requests from requesting wireless devices 12 and serves the requested content from the gateway cache 14, if the requested content is servable from the gateway cache 14. Otherwise, the gateway cache 14 serves the requested content from the content origin servers 24 targeted by the non-proxied content requests. The gateway cache 14 also tracks content consumption for these non-proxied content requests, for use in billing or lawful intercept functions.

An example gateway cache 14 is configured to recognize that a given content request incoming to the gateway cache 14 is a proxied content request based on a proxy indication included in the content request. In turn, an example RAN cache 16 is configured to mark or otherwise structure the proxied content requests it sends in a manner that allows the gateway cache 14 to detect such requests as proxied content requests, rather than an original, un-intercepted content requests from a wireless device 12.

The method 500 may also include direct management, control and tracking of the content that is cached in each RAN cache 16. In an example, the gateway cache 14 controls which specific items of content are stored in the RAN cache 16, based on at least one of: past requests for content from wireless devices 12 previously operating in a same or other area of the RAN 20; and control or configuration information received by or provisioned in the gateway cache 14 that identifies the specific items of content to be cached in the RAN cache 16. Such operation allows the gateway cache 14 to ensure that the RAN cache 16 caches particular items of content, all of which are known to the gateway cache 14. If multiple RAN caches 16 operate under control of the gateway cache 14, it performs content management with respect to each one, and may cache certain content at certain RAN caches 16 but not others.

FIG. 6 provides example configuration details for the RAN cache 16. The example embodiment includes communication interface(s) 60, a cache control circuit 62, memory/storage 54, a RAN cache computer program 66, and content storage 68.

The RAN cache 16 is configured for operation in the RAN 20 of the network 10. As discussed, the network 10 further includes a CN 28 that has a gateway cache 14 that controls the RAN cache 16 as a subordinate of the gateway cache 14.

The depicted RAN cache 16 includes a first communication interface 60-1 towards one or more radio nodes in the RAN 20. In an example case, "towards one or more radio nodes" connotes that the interface is directly with one or more radio nodes 18, such as in a flat implementation used in LTE. In another example case, the interface is with one or more RNCs 30, which in turn interface with and control the radio nodes 18. The RAN cache 16 further includes a second communication interface 60-2 towards the CN 28, e.g., an interface towards the gateway cache 14.

The cache control circuit 62 is operatively associated with the first and second communication interfaces 60-1 and 60-2 and is configured to intercept content requests for requested content. The intercepted content requests are received via the first communication interface 60-1 and originate from wireless devices 12 served by the portion of the RAN 20 with which the RAN cache 16 is associated. Further, the cache control circuit 62 is configured to send proxied content requests corresponding to the intercepted content requests towards the gateway cache 14.

The proxied content requests are sent via the second communication interface 60-2. For each proxied content request sent from the RAN cache 16 to the gateway cache 14, the cache control circuit 62 is configured to serve or not serve the requested content from the RAN cache 16 in dependence on receiving control signaling from the gateway cache 14.

When the received control signaling instructs the RAN cache 16 to serve the requested content from the RAN cache 16, the cache control circuit 62 is configured to serve the requested content from the RAN cache 16, track content consumption information at the RAN cache 16 for the requested content as served from the RAN cache 16, and subsequently send the content consumption information to the gateway cache 14. Conversely, the RAN cache 16 does not serve the requested content, even if the requested content is in its content store 68, for the case when the received control signaling from the gateway cache 14 instructs the RAN cache 16 not to serve the requested content. Equivalently, the RAN cache 16 foregoes serving the requested content in the absence of receiving the instruction to serve.

Figure 7:
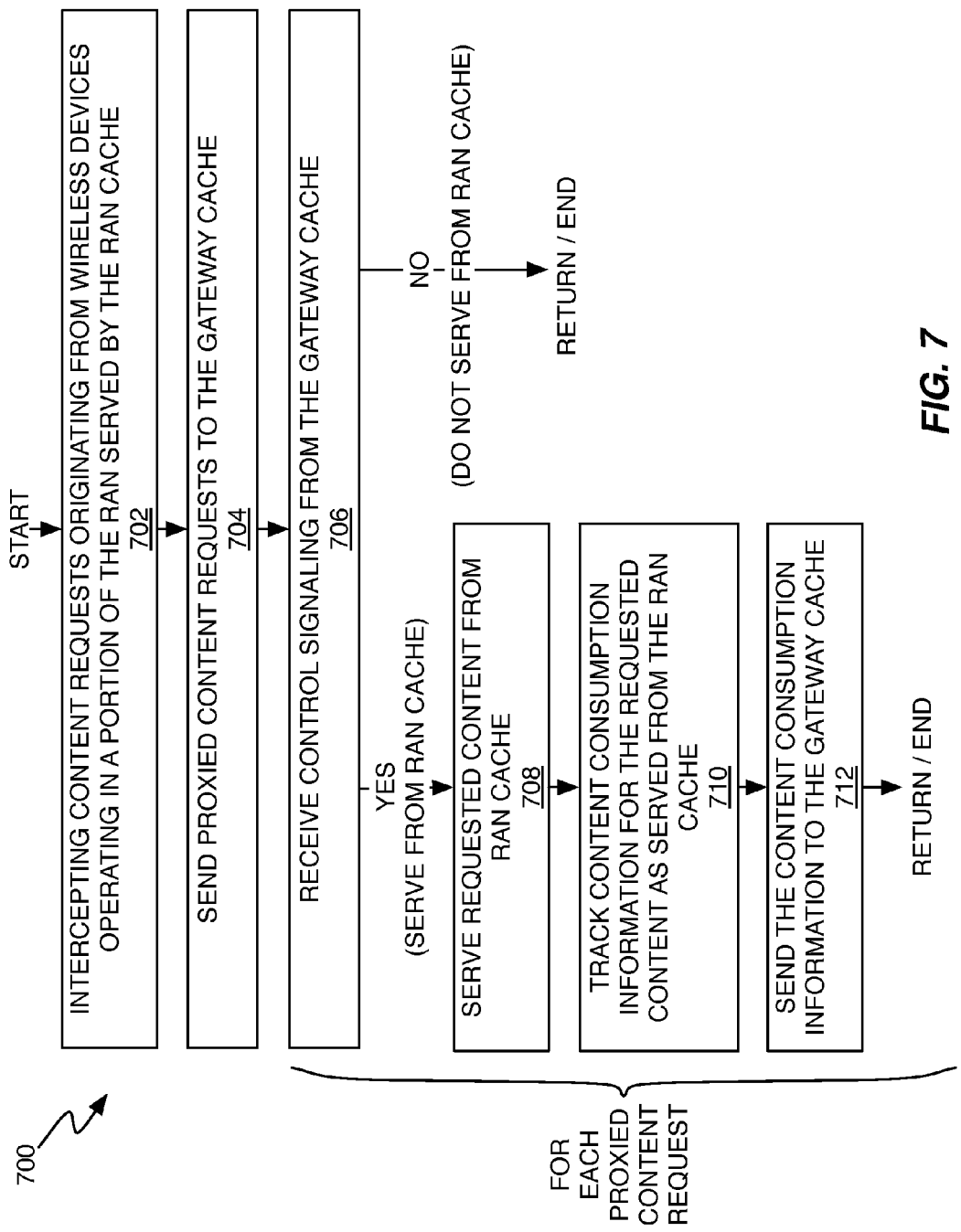
FIG. 7 is a logic flow diagram of one embodiment of a method of processing at a RAN cache.

FIG. 7 illustrates a method 700 that is performed by the RAN cache 16 in one or more embodiments. In an example embodiment, the RAN cache 16 is configured to perform the method 700, or variations of it, based on its execution of computer program instructions stored in a computer-readable medium. For example, the cache control circuit 62 executes the computer program instructions comprising the RAN cache computer program 66, as stored in the memory/storage 64.

In the contemplated method 700, the RAN cache 16 operates in the RAN 20 and gateway cache 14 operates in the CN 28. In some embodiments, the gateway cache 14 operates as a first HTTP proxy at the packet data network interface level of the network 10, and the RAN caches 16 each operate as a second HTTP proxy at the RAN level of the network 10, with each RAN cache 16 operating as a subordinate of the gateway cache 14.

In any case, the method 700 includes intercepting (Block 702) content requests for requested content. The intercepted content requests originate from wireless devices 12 served by a portion of the RAN 20 with which the RAN cache 16 is associated. Such content requests will be understood as flowing towards the packet gateway 40/42 in the CN 28.

The method 700 further includes sending (Block 704) proxied content requests corresponding to the intercepted content requests towards the gateway cache 14. Still further, the method 700 includes, for each given proxied content request sent from the RAN cache 16 to the gateway cache 14 serving or not serving the requested content from the RAN cache 16 in dependence on receiving control signaling from the gateway cache 16.

Thus, according to the method 700, for each proxied content request that is sent by the RAN cache 16 to the gateway cache 14, the RAN cache 16 receives (Block 706) control signaling from the gateway cache 14. The signaling may be implicit or explicit. In either case, the signaling indicates to the RAN cache 16 whether or not it should serve the requested content.

If the signaling indicates that the requested content should be served from the RAN cache 16 (YES from Block 706), the method 700 continues along the YES path by serving (Block 708) the requested content from the RAN cache 16, tracking (Block 710) content consumption information at the RAN cache 16 for the requested content as served from the RAN cache 16, and subsequently sending (Block 712) the content consumption information to the gateway cache 14. Conversely, if the control signaling indicates that the RAN cache 16 should not serve the requested content, it does not serve the requested content. In such instances, the requested content may be served by the gateway cache 14 and/or by a content origin server 24 targeted by the content request.

In some embodiments, the RAN cache 16 intercepts the content requests for requested content based on intercepting Generalized Packet Radio Services Tunneling Protocol (GTP) packets in the RAN 20 that carry HTTP Get requests originating from wireless devices 12 ("clients") being served by the RAN 20, or at least those wireless devices 12 that are served by that portion of the RAN 20 which is associated with the RAN cache 16. Different RAN caches 16 may serve different portions of the RAN 20, with each operating as a subordinate of the gateway cache 14.

In more detail, a given client communicates via GTP to the GI interface and the involved RAN cache 16 uses one of a number of methods to break/snoop the tunnel and send the data back into the tunnel for transmission to the PGW, for delivery to the SGi interface. In particular, the RAN cache 16 is configured to send the proxied content requests by encapsulating proxied HTTP Get requests towards the gateway cache in GTP packets outgoing from the RAN cache 16. Here, a "proxied" HTTP Get request will be understood as an HTTP Get request generated by the RAN cache 16 in correspondence to an HTTP Get request that has been intercepted by the RAN cache 16. In one example, intercepting the GTP packets in the RAN 20 that carry HTTP Get requests comprises the RAN cache 16 inspecting user-plane traffic encapsulated in GTP packets flowing from the RAN 20 towards the packet gateway 40/42 in the CN 28, and intercepting those GTP packets identified as containing HTTP Get requests. In one example, the flow of GTP packets comes directly from the radio nodes 18, and in another example it flows from an RNC 30.

In any case, operating the RAN cache 16 in the RAN 20 of the network 10 includes operating the RAN cache 16 as a first protocol endpoint with respect to the wireless devices 12 originating the content requests, and as a second protocol endpoint with respect to gateway cache 14, to which the proxied content requests are sent. For example, the RAN cache 16 anchors one end of a Transport Control Protocol (TCP) link with a requesting wireless device 12, and anchors one end of a corresponding TCP link with the gateway cache 14.

In some embodiments, the RAN cache 16 includes an indicator in each proxied content request. The indicator allows the gateway cache 14 to recognize proxy content requests as coming from the RAN cache 16, rather than coming directly from the wireless devices 12 originating the intercepted content requests.

Further, in some embodiments, for a given intercepted content request from a given wireless device 12, the RAN cache 16 tracks content consumption information at the RAN cache 16 for the requested content as served from the RAN cache 16, based on tracking an amount of the requested content served from the RAN cache 16 to the given wireless device 12. Subsequently sending the content consumption information to the gateway cache 14 comprises sending information identifying the amount of the requested content that was served from the RAN cache 16 to the given wireless device 12.

Figure 8:
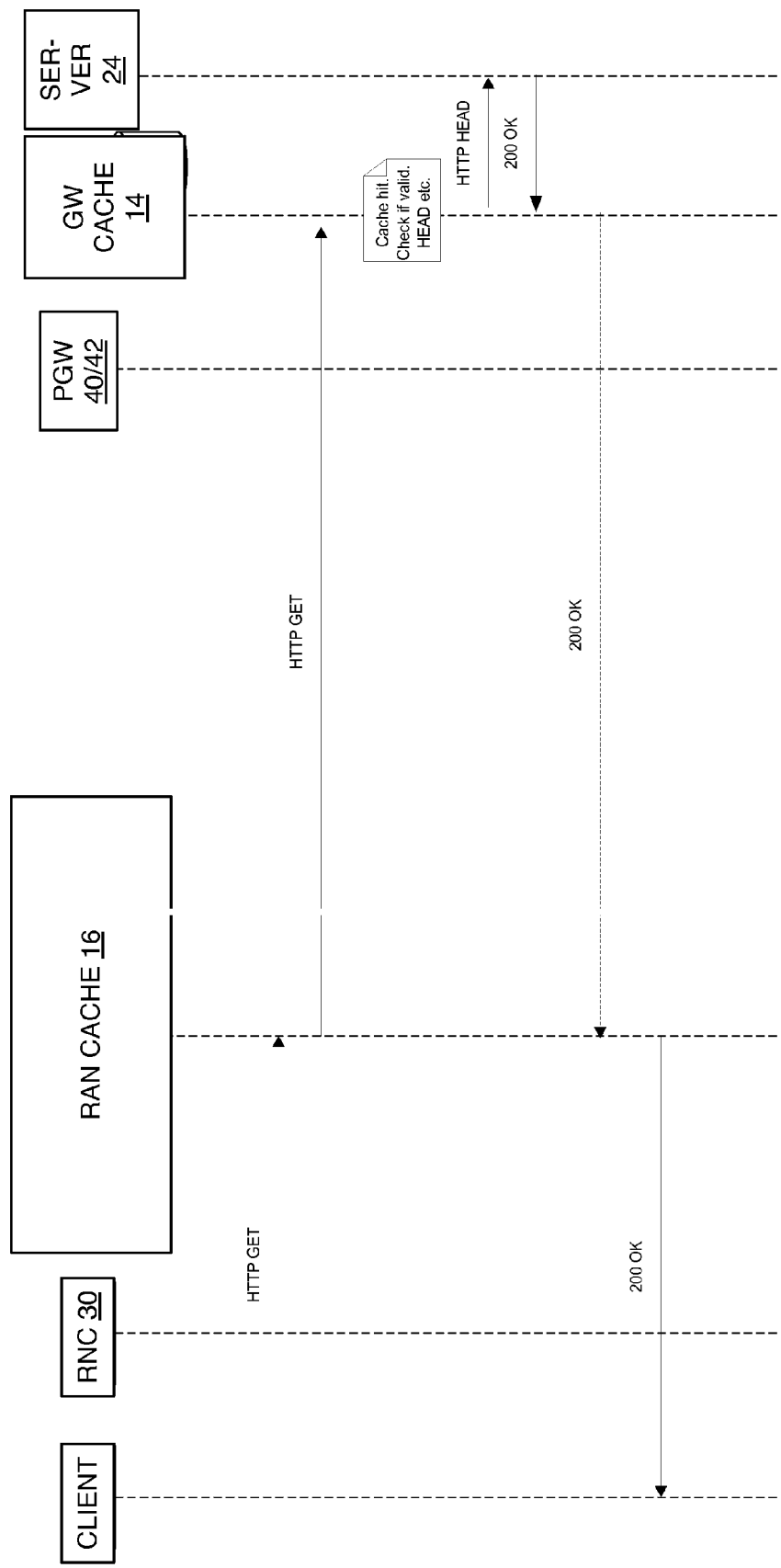
FIG. 8 is a signaling flow diagram for one embodiment of signaling between a RAN cache and a gateway cache, where the gateway cache decides not to serve content from the RAN cache, such as in the case of a cache miss.
Figure 9:
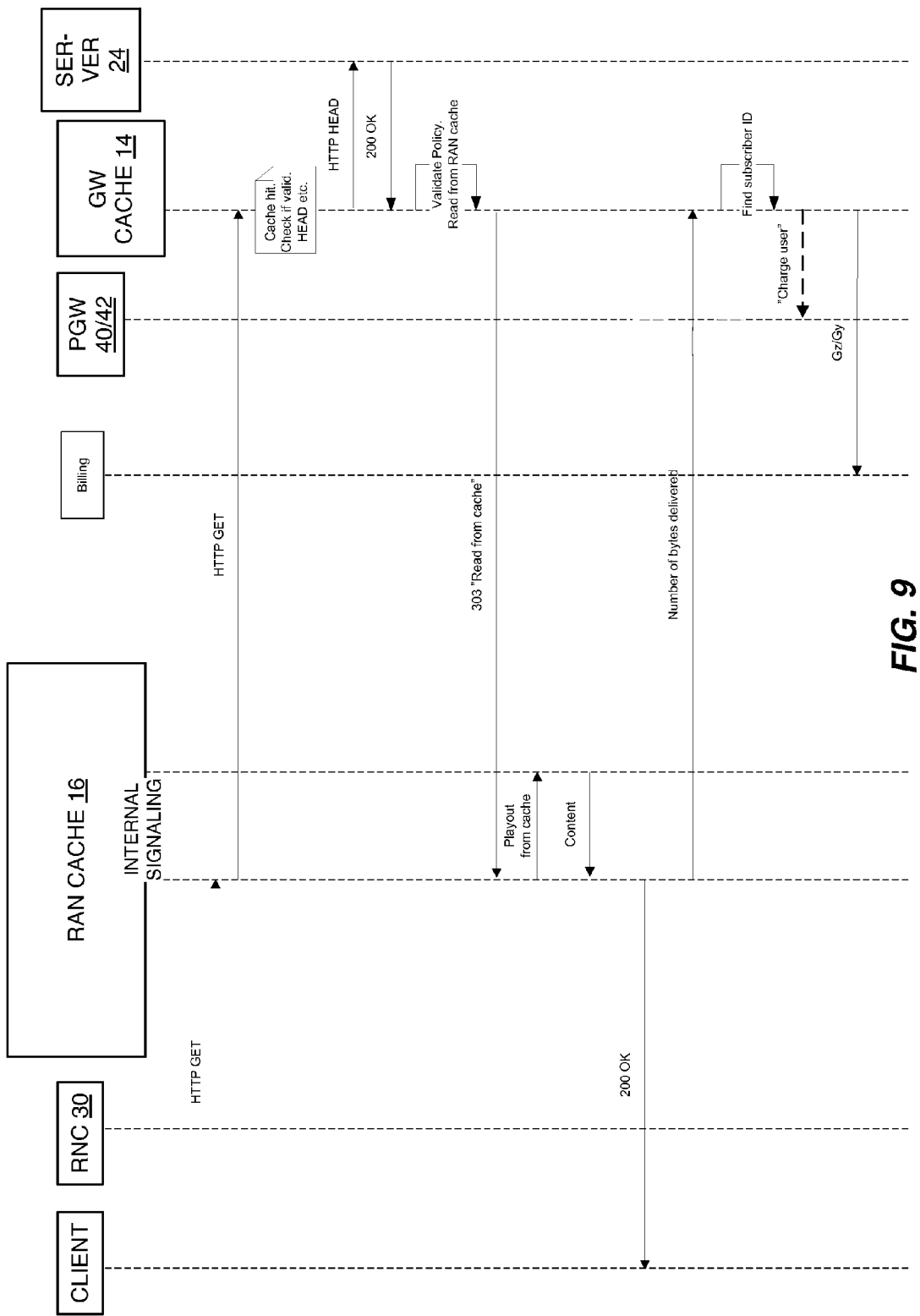
FIG. 9 is a signaling flow diagram for one embodiment of signaling between a RAN cache and a gateway cache, where the gateway cache decides to serve content from the RAN cache.

To aid understanding of the signaling and control involved in a representative embodiment, consider FIGS. 8-11. FIG. 8 depicts the signaling involving a content request from a client in which the gateway cache 14 determines not to serve the requested content from the involved RAN cache 16. FIG. 9 depicts the opposite scenario, where the requested content is available in the involved RAN cache 16 and the gateway cache 14 decides to serve the requested content to the client from the RAN cache 16. One may also note the attendant billing-related signaling from the gateway cache 14 to a billing system node.

Figure 10:
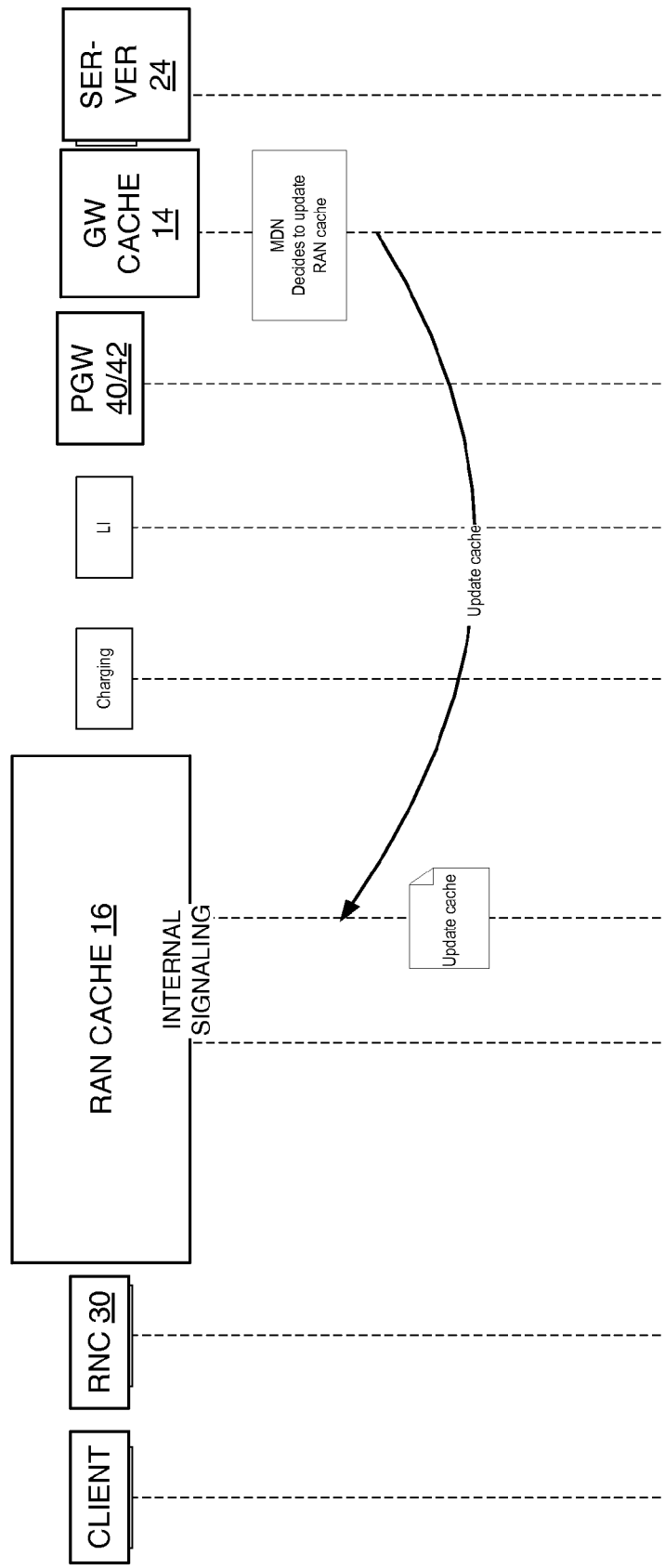
FIG. 10 is a signaling flow diagram for one embodiment of signaling between a RAN cache and a gateway cache, where the gateway cache updates the content stored in the RAN cache.
Figure 11:
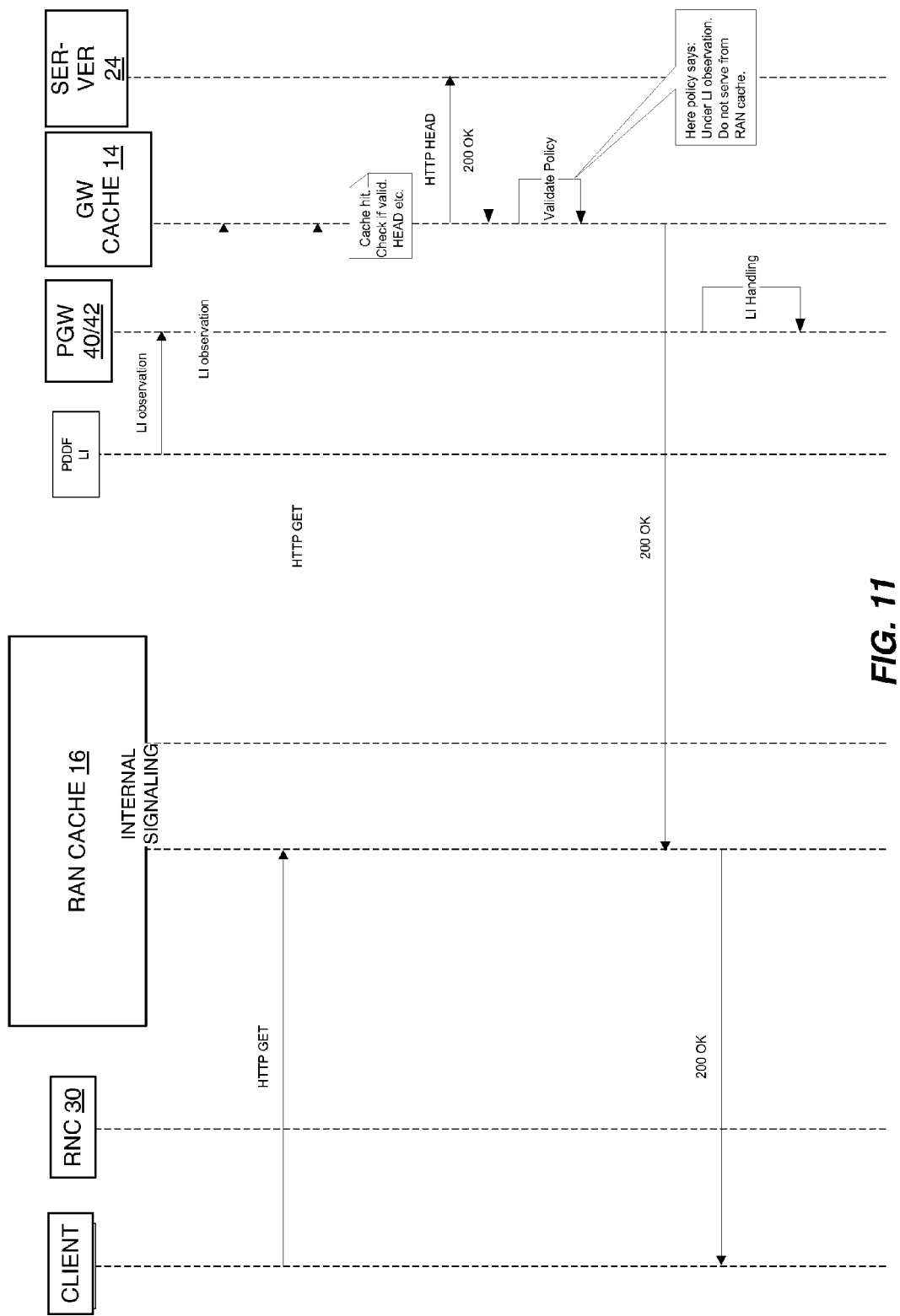
FIG. 11 is a signaling flow diagram for one embodiment of signaling between a RAN cache and a gateway cache, where the gateway cache decides not to serve content from the RAN cache in support of lawful intercept processing.

Continuing, FIG. 10 depicts an example of the gateway cache 14 updating a RAN cache 16, and FIG. 11 illustrates an example of lawful intercept system interfacing. A lawful intercept (LI) node sends lawful intercept signaling to the packet gateway 40/42 of the CN 28, which is then forwarded along to the gateway cache 14. The signaling identifies a client subject to lawful intercept, for example, and may include one or more parameters to control the lawful intercept processing by the gateway cache 14—e.g., whether the actual content served to the client must be saved and provided, or whether copies or listings of such content are sufficient.

In the illustrated example, the gateway cache 14 knows that the depicted client is subject to lawful intercept and thus disallows the involved RAN cache 16 to serve requested content to the client. Instead, the requested content is served from the gateway cache 14, or from the targeted content origin server 24, thereby retaining full visibility of the consumed content for subsequent LI processing.

With the above examples in mind, it will be appreciated that the teachings herein advantageously address the issues caused by the ever increasing demand for broadband traffic by users of wireless communication networks, based on positioning one or more RAN caches 16 in the RAN 20, and operating those RAN caches 16 as subordinates of a gateway cache 14 positioned at a packet data network interface of the wireless communication network. Such operation retains full visibility of what content and how much content is served to individual wireless devices 12, even when some or all of that content is served from edge-located RAN caches 16. Further, such operation is transparent to the wireless devices 12.

By retaining full visibility of served content, all information needed for billing and/or lawful intercept remains available at the gateway cache 14, operating in its "master" role with respect to the RAN caches 16. At the same time, serving requested content from the RAN caches 16 when possible and when permitted reduces back haul loading, and improves the overall user experience associated with consumption of the requested content, e.g., by reducing latency.

The gateway cache 14 in one or more embodiments can be understood as carrying out the following activities: content distribution to RAN caches 16, based on popularity and service requirements; lawful intercept control functions; billing aggregation; and at least some aspects of mobility control, e.g., tracking content requests and/or consumption across multiple RAN caches 16. In at least one embodiment, each RAN cache 16 is configured to be able to receive TCP/IP traffic targeted for another RAN cache 16 and/or destined for the gateway 14, and to tunnel such traffic to the targeted cache.

This configuration allows a wireless device 12 or other client to begin consuming content from one RAN cache 16, and then continue that consumption through one or more other RAN caches 16, as the client moves within the RAN 20. Such other RAN caches 16 act as a surrogate hosts for the RAN cache 16 at which the content consumption was initiated. Once the content end is reached or the client otherwise terminates consumption, new content requests from the client are handled as normal by whichever RAN cache 16 is associated with the current location of the client.

In a further mobility-related enhancement contemplated herein, the gateway cache 14 and/or the individual RAN caches 16 determine how rapidly a given wireless device 12 or other client is moving within the RAN 20. For example, cell handover history may be available from other entities in the RAN, or the rate or number of times at which the client moves from the coverage of one RAN cache 16 to another may be tracked. In any case, a mobility threshold may be defined in this regard and the gateway cache 14 may be configured to take over content delivery for clients that are above the mobility threshold. That is, requested content may be delivered from one or more RAN caches 16, assuming such content is available in the RAN caches 16 and delivery from the RAN caches 16 is permitted for the client, but any remaining portion of the requested content and/or newly requested content will be served from the gateway cache 14, if available, once the mobility of the client exceeds the defined threshold.

Further consider an example case of requested content involving traffic not available in or supported by the RAN cache 16 or the gateway cache 14. In such a case, the client (request originator) is connected via IP to a targeted content origin server 24. The client session in this case connects over the air interface to the RAN 20 and on through the CN 28.

In general, traffic flowing from clients towards the CN 20 may be broken out from the tunnel for inspection at the RAN cache 16. Traffic that is not HTTP or Peer-to-Peer (P2P) traffic is returned to the tunnel and forwarded along towards the CN 20. HTTP and/or P2P content request traffic is proxied according to the teachings herein. In at least one implementation, the RAN cache 16 copies the signal, with one copy passed along towards the gateway cache 16 and one copy kept for the above-described processing in the RAN cache 16.

Thus, one function of the RAN cache 16 is running a policy-based "deep packet inspection" or DPI function that will identify traffic types and forward different types of traffic to the appropriate internal processing functions of the RAN cache 16, which include pass-through or forwarding functions and proxying functions. In the case of intercepting an HTTP Get request, the proxying function sends a proxied Get request to the gateway cache 14, which may be an "enriched" GET request in that it includes the proxied indicator and/or other additional information for the gateway cache 14.

In response to the proxied request, the gateway cache 14 for example sends a head request to the targeted content origin server 24, to validate that the requested content is valid, and it looks up the content being requested to see if it is in the RAN cache 16 and/or in the gateway cache 14. The gateway cache 14 further checks the billing details and the lawful intercept status of the user associated with the client that originated the content request, and the location of the client may be analyzed to ensure that the user is not "flip-flopping." The idea here is that if a mobile client is on a cell border within the network 10, the client could be moving between RAN caches 16 a number of times and that mobility may delay content delivery from the RAN caches 16. Thus, rather than continuing subjecting that client to mobility-related content delivery delays, the gateway cache 14 decides to service the content request(s) from the client from the master cache 14.

For the case that all verifications or checks "pass," the gateway cache 14 allows the content to be served from the RAN cache 16. Thus, the gateway cache 14 sends an enriched Head Response to the RAN cache 16, which enables the RAN cache 16 to respond to the requesting client, based on building a response from content stored locally in the RAN cache 16. Conversely, if one or more of the verifications or checks do not pass, the gateway cache 14 sends a head response to the RAN cache 16, which contains a "No Cache" message or indicator. The gateway cache 14 will then service the content request, or pass it to the targeted content origin server 24, for service.

The deployment of RAN caches 16 as contemplated herein also enables a range of content optimizations, including application hosting and a new type of application environment is contemplated in this disclosure. In particular, applications may be hosted in RAN caches 16, to yield better performance and/or to reduce back haul traffic associated with such applications. By convention, a network-delivered application or application service would rely on Dynamic Site Acceleration (DSA), for optimization of dynamically-served content. However, an application running in the newly contemplated environment within a RAN cache 16 implements a communications step, in which the application requests permission to service a request incoming from a client. The request is sent to the gateway cache 14 for the approval decision and return control signaling to the RAN cache 16 determines whether or not the application services the request.

The teachings herein also should be understood as providing radio cell awareness in the caching context. A significant advantage of RAN caching 16 as taught herein is that the caching is close enough to the RAN 20, or, indeed, integrated into the RAN 20, and caching can thus react to changes in congestion and available bandwidth.

Figure 12:
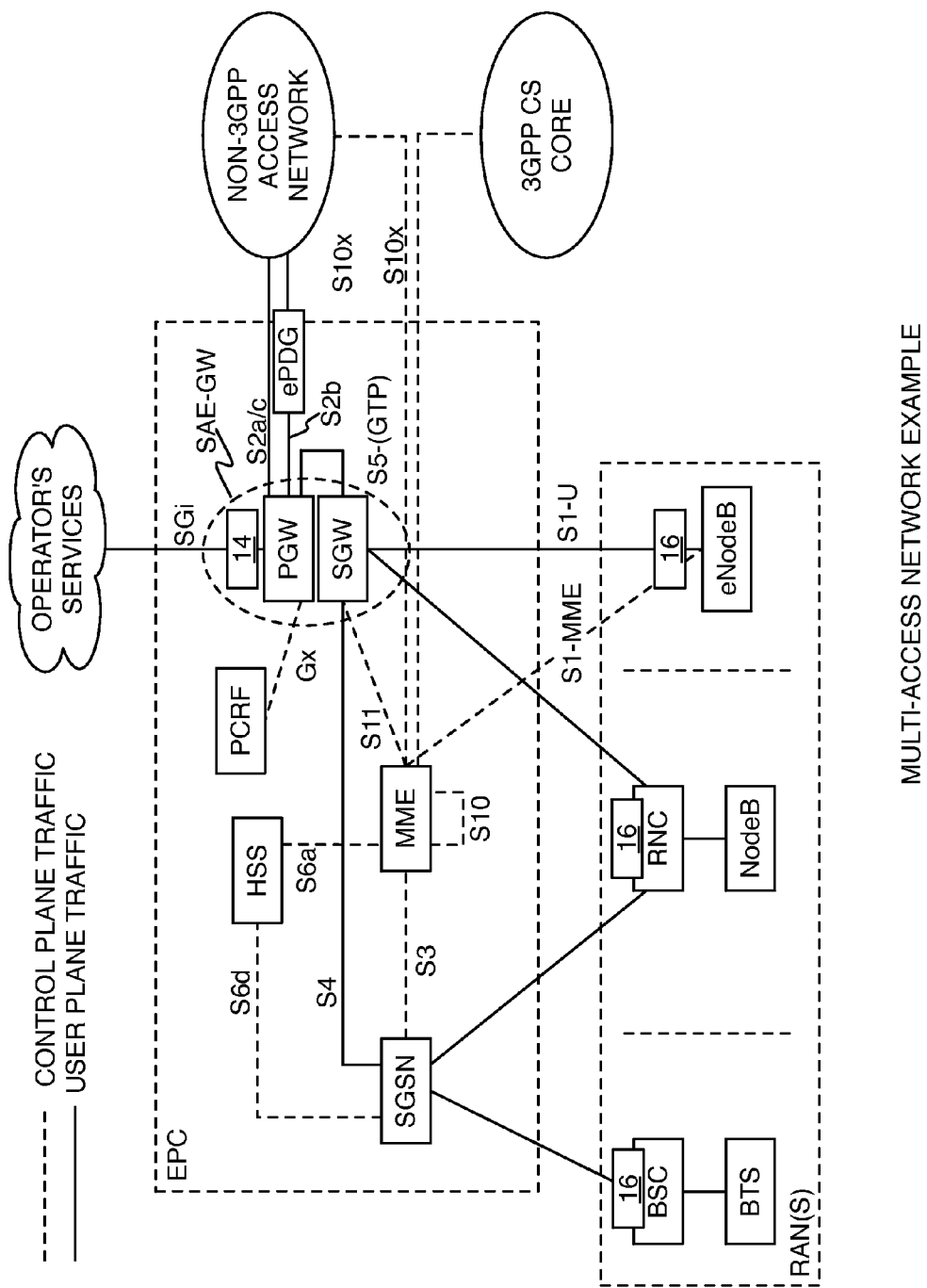
FIG. 12 is a block diagram illustrating example functional processing locations contemplated for the gateway and RAN caches in the context of a multi-access 3GPP network architecture.

Consider FIG. 12 for example, which is a block diagram illustrating example functional processing locations contemplated for the gateway and RAN caches 14 and 16 in the context of a multi-access 3GPP network architecture. Of course, this presentation is non-limiting and the contemplated caching can be implemented in networks that do not provide multi-access and lack one or more of the nodes illustrated in FIG. 12.

For example, FIG. 12 illustrates both 3G and 4G network nodes and correspondingly one sees different RAN arrangements, including BSC/BTS implementations as may be used in GERAN, RNC/NodeB implementations as may be used in WCDMA/HSPA, and eNodeB implementations, as may be used in LTE/LTE-A. In each such arrangement, a RAN cache 16 may be physically or at least functionally implemented at a point in the RAN(s) that enables the intercept and proxy functions contemplated herein for RAN caches 16.

FIG. 12 also illustrates implementation of the gateway cache 14 within the EPC, at the SGi interface associated with the SAE-GW of the EPC. The contemplated arrangement allows the delivery of cached content at or near the edge of the network 10, while retaining full visibility into the delivery of cached content at the SGi level. As noted, this arrangement and the other arrangements shown by way of example herein offer a number of advantages.

For example, in at least some embodiments, the RAN caches 16 and/or the gateway cache 14 are configured to dynamically adapt to changing network loading, e.g., loading levels and/or loading imbalances in the RAN 20. For example, such control may dynamically adapt the delivery of cached video content as a function of cell loading, or may sequence the delivery of cached content into a given cell 32, based on the available bandwidth, congestion and service levels involved. Additionally or alternatively, a given RAN cache 16 and/or its controlling gateway cache 14 may be configured to perform burst delivery of cached content, such as video, to a client operating in a cell 32 with low congestion.

The contemplated arrangement of RAN caches 16 and gateway caches 14 also allows for IP enhancements, such as optimizing the behavior of IP connections between clients and content origin servers 24. For example, sessions may be pipelined to optimize session setup and multipart content requests can be handled intelligently by a RAN cache 16 asking permission for all of the multipart elements at the same time. In general, a RAN cache 16 can optimize the communications for the use, such as pre fetching pages, split TCP and other things, but only under the control of the gateway cache 14.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of content caching in a wireless communication network comprising a Radio Access Network (RAN) and a Core Network (CN), said method comprising:
   operating a gateway cache in the CN at a packet data network interface of the CN;
   operating a RAN cache in the RAN as a subordinate of the gateway cache;
   wherein operating the RAN cache includes:
      intercepting content requests for requested content, said intercepted content requests originating from wireless devices served by a portion of the RAN with which the RAN cache is associated;
      sending proxied content requests corresponding to the intercepted content requests, to the gateway cache; and
      for each given proxied content request sent from the RAN cache to the gateway cache, serving or not serving the requested content from the RAN cache in dependence on receiving control signaling from the gateway cache; and
      when the received control signaling instructs the RAN cache to serve the requested content from the RAN cache, serving the requested content from the RAN cache, tracking content consumption information at the RAN cache for the requested content as served from the RAN cache, and subsequently sending the content consumption information to the gateway cache; and
   wherein operating the gateway cache includes:
      receiving the proxied content requests from the RAN cache; and
      for each given proxied content request, determining whether or not to serve the requested content from the RAN cache based on determining whether or not the requested content is in the RAN cache, and further based on determining whether delivery of the requested content is restricted from delivery via the RAN cache, either on the basis of the requested content or on the basis of the wireless device that requested the requested content.

2. A method of content delivery from a wireless communication network that includes a Radio Access Network (RAN) and a Core Network (CN), said method comprising operating a RAN cache in the RAN, and including:
   intercepting content requests for requested content, said intercepted content requests originating from wireless devices served by a portion of the RAN with which the RAN cache is associated and flowing towards a packet gateway in the CN;
   sending proxied content requests corresponding to the intercepted content requests towards a gateway cache operating at a packet data network interface of the packet gateway in the CN;
   for each given proxied content request sent from the RAN cache to the gateway cache, serving or not serving the requested content from the RAN cache in dependence on receiving control signaling from the gateway cache; and
   when the received control signaling instructs the RAN cache to serve the requested content from the RAN cache, serving the requested content from the RAN cache, tracking content consumption information at the RAN cache for the requested content as served from the RAN cache, and subsequently sending the content consumption information to the gateway cache.

3. The method of claim 2, wherein intercepting the content requests for requested content comprises intercepting Generalized Packet Radio Services Tunneling Protocol (GTP) packets in the RAN that carry HTTP Get requests originating from wireless devices being served by the RAN.

4. The method of claim 3, wherein sending the proxied content requests comprises encapsulating proxied HTTP Get requests towards the gateway cache in GTP packets outgoing from the RAN cache.

5. The method of claim 3, wherein intercepting the GTP packets in the RAN that carry HTTP Get requests comprises inspecting user-plane traffic encapsulated in GTP packets flowing from the RAN towards the packet gateway in the CN and intercepting those GTP packets identified as containing HTTP Get requests.

6. The method of claim 2, wherein operating the RAN cache in the RAN of the wireless communication network includes operating the RAN cache as a first protocol endpoint with respect to the wireless devices originating the content requests, and as a second protocol endpoint with respect to gateway cache, to which the proxied content requests are sent.

7. The method of claim 2, wherein sending the proxied content requests includes including an indicator in each proxied content request, so that the gateway cache recognizes said proxy requests as coming from the RAN cache rather than coming directly from the wireless devices originating the intercepted content requests.

8. The method of claim 2, wherein, for a given intercepted content request from a given wireless device, tracking the content consumption information at the RAN cache for the requested content as served from the RAN cache comprises tracking an amount of the requested content served from the RAN cache to the given wireless device, and wherein subsequently sending the content consumption information to the gateway cache comprises sending information identifying the amount of the requested content that was served from the RAN cache to the given wireless device.

9. A Radio Access Network (RAN) cache configured for operation in the RAN of a wireless communication network that further includes a Core Network (CN), said RAN cache comprising:
   a first communication interface towards one or more radio nodes in the RAN;
   a second communication interface towards the CN;
   a cache control circuit operatively associated with the first and second communication interfaces and configured to:
      intercept content requests for requested content, said intercepted content requests received via the first communication interface and originating from wireless devices served by a portion of the RAN with which the RAN cache is associated;
      send proxied content requests corresponding to the intercepted content requests towards the gateway cache operating at a packet data network interface of the packet gateway in the CN, said proxied content requests sent via the second communication interface;
      for each given proxied content request sent from the RAN cache to the gateway cache, serve or not serve the requested content from the RAN cache in dependence on receiving control signaling from the gateway cache; and
      when the received control signaling instructs the RAN cache to serve the requested content from the RAN cache, serve the requested content from the RAN cache, track content consumption information at the RAN cache for the requested content as served from the RAN cache, and subsequently send the content consumption information to the gateway cache.

10. A method of content delivery from a wireless communication network that includes a Radio Access Network (RAN) and a Core Network (CN), said method comprising operating a gateway cache at a packet data network interface of the CN, and including:
   receiving proxied content requests from a RAN cache operating in the RAN, said RAN cache operating as a subordinate of the gateway cache and sending the proxied content requests based on intercepting content requests originating from wireless devices operating in a portion of the RAN served by the RAN cache;
   for each given proxied content request received at the gateway cache:
      determining whether or not to serve the requested content from the RAN cache based on determining whether or not the requested content is in the RAN cache, and further based on determining whether delivery of the requested content is restricted from delivery via the RAN cache, either on the basis of the requested content or on the basis of the wireless device that requested the requested content;
      when the decision is made to serve the requested content from the RAN cache, sending control signaling instructing the RAN cache to serve the requested content, subsequently receiving content consumption information from the RAN cache indicating an amount of the requested content that was served to the requesting wireless device, and recording the content consumption information for charging and/or lawful intercept uses; and
      when the decision is made not to serve the requested content from the RAN cache, sending control signaling to the RAN cache instructing the RAN cache not to serve the requested content, serving the requested content from the gateway cache if the requested content is servable from the gateway cache or serving the requested content from a content origin server targeted by the proxied content request, and recording content consumption information for billing and/or lawful intercept purposes, indicating the amount of the requested content as served from the gateway cache or as obtained from the content origin server.

11. The method of claim 10, further comprising providing the content consumption information recorded in conjunction with a given proxied content request to a lawful intercept control server and/or to a billing system.

12. The method of claim 10, further comprising receiving non-proxied content requests originating directly from requesting wireless devices operating in the RAN, serving the requested content corresponding to the non-proxied content requests from the gateway cache if the requested content is servable from the gateway cache or otherwise serving the requested content from one or more content origin servers targeted by the non-proxied content requests, tracking content consumption by the requesting wireless devices in conjunction with serving the requested content, and recording the content consumption for use in billing or lawful intercept functions.

13. The method of claim 10, further comprising recognizing that a given content request incoming to the gateway cache is one of said proxied content requests based on a proxy indication included in the proxied content request.

14. The method of claim 10, further comprising controlling which specific items of content are stored in the RAN cache based on at least one of: past requests for content from wireless devices previously operating in a same or other area of the RAN; and control or configuration information received by or provisioned in the gateway cache identifying the specific items of content to be cached in the RAN cache.

15. A gateway cache configured for operation in a Core Network (CN) of a wireless communication network, said gateway cache configured to operate at a packet data network interface of the CN and comprising:
    a first communication interface toward a RAN cache operating in the RAN as a subordinate of the gateway cache;
    a second communication interface towards the packet data network interface; and
    a cache control circuit operatively associated with the first and second communication interfaces and configured to:
        receive proxied content requests from the RAN cache, said proxied content requests corresponding to intercepting content requests originating from wireless devices operating in a portion of the RAN served by the RAN cache and intercepted by the RAN cache;
    for each given proxied content request received at the gateway cache:
        determine whether or not to serve the requested content from the RAN cache based on determining whether or not the requested content is in the RAN cache, and further based on determining whether delivery of the requested content is restricted from delivery via the RAN cache, either on the basis of the requested content or on the basis of the wireless device that requested the requested content;
        when the decision is made to serve the requested content from the RAN cache, send control signaling instructing the RAN cache to serve the requested content, subsequently receive content consumption information from the RAN cache indicating an amount of the requested content that was served to the requesting wireless device, and record the content consumption information for charging and/or lawful intercept uses; and
        when the decision is made not to serve the requested content from the RAN cache, send control signaling to the RAN cache instructing the RAN cache not to serve the requested content, serve the requested content from the gateway cache if the requested content is servable from the gateway cache or serve the requested content from a content origin server targeted by the proxied content request, and record content consumption information for billing and/or lawful intercept purposes that indicates the amount of the requested content as served from the gateway cache or the content origin server.

\* \* \* \* \*